(12) United States Patent
Redjal et al.

(10) Patent No.: US 11,382,453 B2
(45) Date of Patent: Jul. 12, 2022

(54) COOKING UTENSIL WITH HANDLE STRUCTURE

(71) Applicant: PROBALCO BVBA, Kortrijk (BE)

(72) Inventors: Karim Redjal, Zwevegem (BE); Pol Speleers, Waregem (BE)

(73) Assignee: PROBALCO BVBA, Kortrijk (BE)

( * ) Notice: Subject to any disclaimer, the term of this patent is extended or adjusted under 35 U.S.C. 154(b) by 331 days.

(21) Appl. No.: 16/343,031

(22) PCT Filed: Oct. 25, 2017

(86) PCT No.: PCT/BE2017/000046
§ 371 (c)(1),
(2) Date: Apr. 18, 2019

(87) PCT Pub. No.: WO2018/076080
PCT Pub. Date: May 3, 2018

(65) Prior Publication Data
US 2020/0046164 A1     Feb. 13, 2020

(30) Foreign Application Priority Data
Oct. 25, 2016   (BE) .................................. 2016/5802

(51) Int. Cl.
| | | |
|---|---|---|
| *A47J 36/24* | (2006.01) | |
| *A47J 41/00* | (2006.01) | |
| *A47J 36/02* | (2006.01) | |
| *A47J 45/06* | (2006.01) | |

(52) U.S. Cl.
CPC .......... *A47J 36/2494* (2013.01); *A47J 36/02* (2013.01); *A47J 41/0044* (2013.01); *A47J 45/061* (2013.01)

(58) Field of Classification Search
CPC .... A47J 36/2494; A47J 36/02; A47J 41/0044; A47J 45/061
USPC ........................................... 220/573.1, 573.3
See application file for complete search history.

(56) References Cited

U.S. PATENT DOCUMENTS

| | | | | |
|---|---|---|---|---|
| 5,643,485 | A * | 7/1997 | Potter | F01N 3/2889 219/621 |
| 5,947,008 | A * | 9/1999 | Fullmer | A47J 27/10 99/342 |
| 6,147,337 | A * | 11/2000 | Besser | C09K 5/14 126/375.1 |
| 6,305,272 | B1 * | 10/2001 | Lin | A47J 27/002 126/369 |

(Continued)

FOREIGN PATENT DOCUMENTS

EP        0836823 A1      4/1998

OTHER PUBLICATIONS

International Search Report and Written Opinion for the International Patent Application No. PCT/BE2017/00046, dated Apr. 17, 2018, 8 pages.

*Primary Examiner* — J. Gregory Pickett
*Assistant Examiner* — Niki M Eloshway
(74) *Attorney, Agent, or Firm* — KDB Firm PLLC

(57) ABSTRACT

Cooking utensil with at least one handle structure. The cooking utensil includes a bottom wall and an upright side wall with an outer side. The at least one handle structure is arranged against the outer side of the upright side wall. The at least one handle structure includes a gripping part configured to be grippable by a user. The at least one handle structure includes a phase-change material.

20 Claims, 5 Drawing Sheets

(56) References Cited

U.S. PATENT DOCUMENTS

| | | | |
|---|---|---|---|
| 2005/0167435 A1* | 8/2005 | Whitmer | A47J 37/103 220/573.1 |
| 2006/0196497 A1* | 9/2006 | Dean | A47J 41/0044 126/246 |
| 2006/0219724 A1 | 10/2006 | Melnik | |
| 2011/0067842 A1* | 3/2011 | Campbell | A47J 36/00 165/104.21 |
| 2014/0260998 A1* | 9/2014 | Pearson | A47J 27/002 99/288 |
| 2015/0313403 A1* | 11/2015 | Park | A47J 36/00 220/573.1 |
| 2017/0224175 A1* | 8/2017 | Compeau | A47J 37/101 |
| 2020/0281398 A1* | 9/2020 | Redjal | F25D 3/08 |
| 2021/0022560 A1* | 1/2021 | Servaites | A47J 45/071 |

* cited by examiner

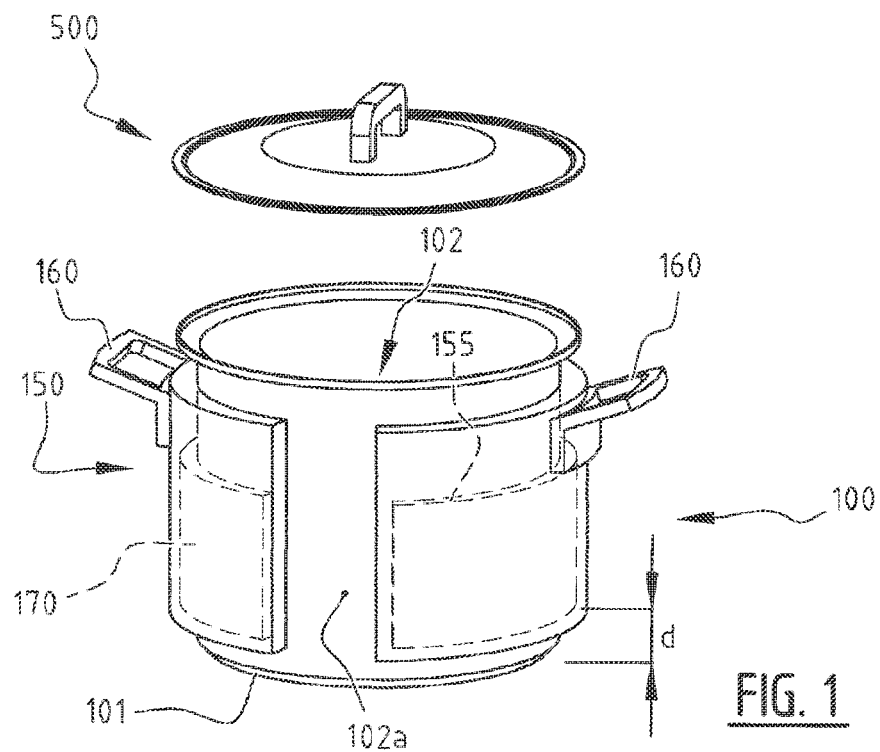
FIG. 1
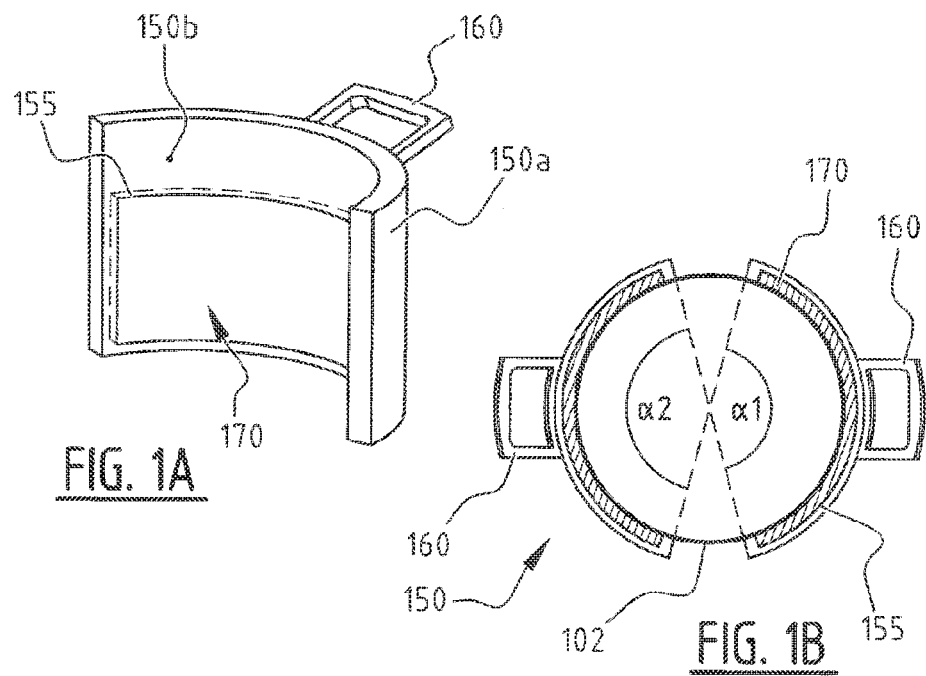
FIG. 1A
FIG. 1B

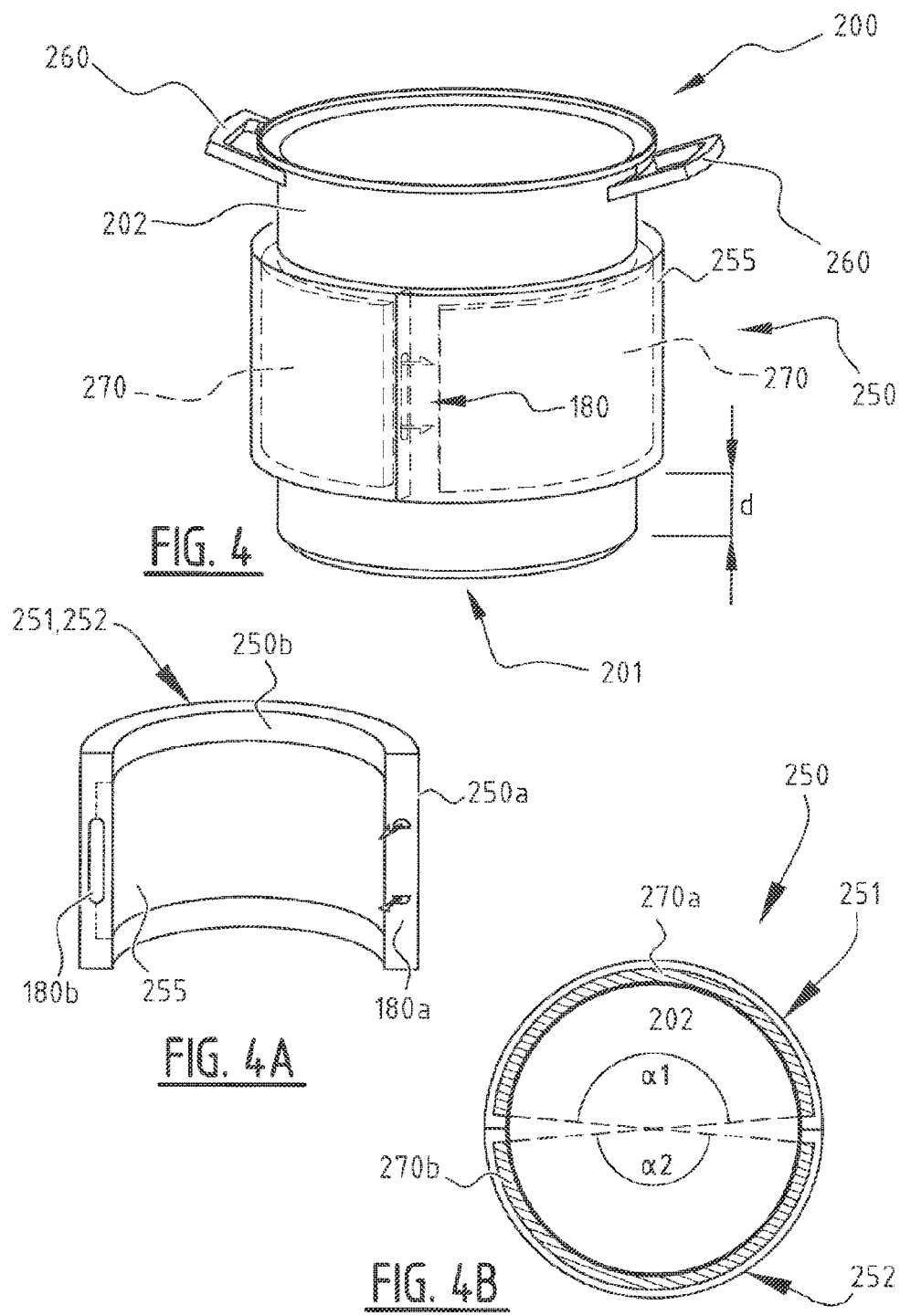

COOKING UTENSIL WITH HANDLE STRUCTURE

This is a national stage application filed under 35 U.S.C. § 371 of pending international application PCT/BE2017/000046 filed Oct. 25, 2017, which claims priority to Belgian patent application BE 2016/5802, filed Oct. 25, 2016, the entirety of which applications are hereby incorporated by reference herein.

FIELD OF THE INVENTION

The present invention relates to a cooking utensil with at least one handle structure and to a cooking utensil with at least one warm-keeping structure.

BACKGROUND

The use of phase-change material as heat storage material, wherein the phase-change material is able to absorb heat in a relatively short time and to relinquish this heat again over a longer period of time, is known. An example of such an application is the use of phase-change material in a plate on which hot food is served. By making use of phase-change material the plate will cool less quickly and the food will remain warm for longer. A cavity filled with phase-change material is typically provided in the bottom of the plate. Phase-change materials used for this and similar applications in crockery are solid at room temperature and transpose to a liquid phase at higher temperatures at which they absorb heat.

Uses of phase-change material as heat storage material are described in the patent applications with application numbers 2016/5522 and 2016/5527 in the name of applicant, which are included here by way of reference.

SUMMARY OF THE INVENTION

Embodiments of the invention have the object of providing a cooking utensil wherein good contact between the bottom wall of the cooking utensil and the cooking hob can be guaranteed during heating, and wherein the content of the cooking utensil remains warm for longer after heating as compared to traditional cooking utensils.

A first aspect of the invention relates to a cooking utensil with at least one handle structure, wherein the cooking utensil comprises a bottom wall and an upright side wall with an outer side. The at least one handle structure is arranged against the outer side of the upright side wall. The at least one handle structure comprises a gripping part configured to be grippable by a user. The at least one handle structure comprises a phase-change material.

Because the phase-change material is received in the at least one handle structure, the phase-change material is situated close to the outer side of the upright side wall and the bottom wall of the cooking utensil remains free of phase-change material. A good contact between the bottom wall of the cooking utensil and the hob remains guaranteed hereby. The phase-change material will moreover absorb heat when the cooking utensil is being heated, and the phase-change material will gradually release the absorbed heat to the cooking utensil again after the heating. The content of the cooking utensil can remain at temperature for longer owing to the heat released by the phase-change material to the content in the cooking utensil. By providing the phase-change material in the last one handle structure the assembly of the cooking utensil can take place in simple manner, without appreciable changes having to be made to the manufacturing process.

Embodiments of the invention are further based on the insight that, in contrast to a plate on which hot food is served, a cooking utensil is heated along the underside thereof. Temperatures at the bottom wall of the cooking utensil can hereby become very high. The best possible contact between the bottom wall of the cooking utensil and the hob is furthermore required during cooking in order to heat the cooking utensil as efficiently as possible. The inventors have further established that the temperature is significantly lower at the side wall of the utensil. By providing the phase-change material on the outer side of the side wall, in a handle structure, the heating is not impeded and it is still achieved that the content of the utensil is kept warm well after heating.

In a preferred embodiment the at least one handle structure has an inner side and an outer side, wherein the gripping part is provided on the outer side and the phase-change material is provided in a recess on the inner side of the at least one handle structure.

In this way the phase-change material lies against or close to the side wall of the cooking utensil and heat can be released to the phase-change material during cooking, without large amounts of heat being lost.

In a preferred embodiment the phase-change material lies at a distance from the bottom wall, wherein the distance is smaller than 4 cm, preferably smaller than 2 cm, still more preferably smaller than 1.5 cm, and most preferably smaller than 1 cm.

In this way the phase-change material can advantageously absorb heat released by the hob to the bottom wall of the cooking utensil. At the bottom wall the temperature can rise to about 250° C. This temperature however decreases rapidly along the upright side wall of the cooking utensil in the direction away from the bottom wall. It is generally the case that the closer the phase-change material is situated to the bottom wall of the cooking utensil, the better the phase-change material can absorb heat. When the phase-change material releases the absorbed heat back to the cooking utensil, it is advantageous for the phase-change material to be situated at the lower side of the outer side of the upright side wall, since the heat can then be released to the content of the cooking utensil from the bottom.

In a preferred embodiment the recess on the inner side of the at least one handle structure comprises a plurality of compartments and phase-change material is provided in the compartments.

Phase-change material can in this way be distributed in the recess in a desired manner. The phase-change material can thus for instance be distributed uniformly in the recess by sub-dividing the recess into a number of compartments with mutually equal dimensions. Alternatively, compartments with different dimensions can be provided in order to distribute the phase-change material in the recess in a different way so that more phase-change material is situated at for instance the lower side of the outer side of the upright side wall than at the upper side of the outer side of the upright side wall.

In a preferred embodiment the phase-change material is for each handle structure of the at least one handle structure received in a pouch which is arranged in the relevant handle structure and is adjacent to the outer side of the upright side wall.

By providing the phase-change material in a pouch the freedom of movement of the phase-change material is limited by the pouch. Accommodating the phase-change material in a pouch reduces the risk of particles of the phase-change material escaping from the handle structure when the phase-change material is in the liquid phase. Accommodating the phase-change material in a pouch makes it possible to prevent the phase-change material in the liquid phase from being able to move freely in the recess of the handle structure under the influence of movements of the cooking utensil. In other words, the phase-change material is thus held better in place, whereby the absorption and releasing of heat by the phase-change material typically become more efficient. The phase-change material in the pouch is moreover protected from possible contaminants, protected against possible degradation of the phase-change material, and igniting of the phase-change material is avoided. In other embodiments of the invention it is however also possible to receive the phase-change material in an internal closed cavity of a handle structure.

In a preferred embodiment the pouch is pressed against the outer side of the upright side wall by the handle structure.

In this way it is possible to achieve that the phase-change material makes the best possible contact with the outer side of the upright side wall, so that the phase-change material can absorb heat from and release heat to the cooking utensil in efficient and advantageous manner.

In an exemplary embodiment the pouch comprises a first wall and a second wall, wherein a peripheral part of the second wall is attached to a peripheral part of the first wall and wherein a high vacuum prevails in the pouch.

In this way the phase-change material in the pouch is protected from possible contaminants, protected against possible degradation of the phase-change material, and igniting of the phase-change material is avoided by the vacuum pouch.

In a preferred embodiment the pouch is adapted to be pressed in fitting manner against the outer side of the upright side wall. The pouch can for instance be preformed so that it is adapted to a curvature of the upright side wall. This has the result that a more efficient heat transfer is possible between the cooking utensil and the pouch, and vice versa. In an alternative embodiment the pouch comprises a plurality of compartments which are separated from each other by a pliable strip. The pouch hereby gains flexibility, and the pouch can be pressed and/or arranged in fitting manner against the outer side of the upright side wall. The pliable strips are preferably arranged in a direction corresponding to a height direction of the cooking utensil, so that the different compartments of the pouch can be formed in accordance with the curvature of the upright side wall of the cooking utensil. The compartments preferably take the form of bars, bands, spheres, beams and/or cubes. It will however be apparent to the skilled person that the compartments can also take other forms, as long as an improved pliability and/or flexibility of the pouch is obtained. It will further be apparent to the skilled person that, as an alternative to the pouch with a plurality of compartments, use can be made of individual pouches which may or may not be connected to each other in order to achieve that the curvature of the upright side wall of the cooking utensil is followed and a more efficient heat exchange is thus obtained. A more uniform distribution of phase-change material can moreover be obtained by using a compartmentalized pouch and/or using different individual pouches. By for instance arranging different compartments in the height direction of the side wall of the cooking utensil it is possible to prevent phase-change material sinking downward or being displaced in another direction.

According to a preferred embodiment, the at least one handle structure and the outer side of the upright side wall enclose a space in which the phase-change material is received.

In this way the phase-change material is situated close to the outer side of the upright side wall and a good absorption and releasing of heat is guaranteed, while the handle structure prevents a user of the cooking utensil from coming into contact with the phase-change material.

In a preferred embodiment the phase-change material of the at least one handle structure extends through an angle of at least 250°, preferably at least 300° of the circumference of the outer side of the upright side wall.

In this way it is possible to provide phase-change material around the greatest possible portion of the circumference of the outer side of the upright side wall. The greater the portion of the circumference around which phase-change material is provided, the more heat can generally be absorbed and released by the phase-change material.

In a preferred embodiment the phase-change material is situated in a band around substantially the whole circumference of the outer side of the upright side wall.

In this way heat cannot leave the cooking utensil at the position of the band without herein coming into contact with the phase-change material. Compared to embodiments wherein clear surfaces, wherein no phase-change material is arranged against the side wall, can be detected all around the periphery of the upright side wall, providing a band of phase-change material around substantially the whole circumference of the outer side of the upright side wall will typically allow the phase-change material to absorb and release more heat.

In an exemplary embodiment the bottom wall and the upright side wall are manufactured from at least one of stainless steel, aluminium and cast iron.

These materials are known for their heat-conducting and flame-resistant properties, whereby these materials are highly suitable for manufacturing the bottom wall and upright side wall of a cooking utensil.

In a preferred embodiment the at least one handle structure is mounted on the side wall by one or more of the following: a rivet connection, a weld, a clamp connection.

In this way the handle structure can be arranged on the cooking utensil in a sufficiently secure manner and the phase-change material in the handle structure can be positioned in advantageous manner.

In an exemplary embodiment at least one mounting plate is arranged on the outer side of the side wall and the at least one handle structure is mounted on the at least one mounting plate.

In this way only a mounting plate need be arranged directly on the cooking utensil, instead of a whole handle structure. The handle structure can thus moreover optionally be arranged on the cooking utensil in removable manner. A handle structure could hereby be coupled to a plurality of mounting plates and a plurality of cooking utensils.

In a preferred embodiment the at least one handle structure comprises at least at a lower side thereof a flame-resistant layer, wherein the flame-resistant layer is preferably manufactured from aluminium or stainless steel.

In this way other parts of the handle structure are protected against heat and flames coming from the hob on which the cooking utensil is placed during heating. The flame-resistant layer prevents other parts of the handle structure from catching fire. In an exemplary embodiment the flame-resistant layer extends along the outer side of the handle structure.

In a preferred embodiment the phase-change material extends in a layer with a thickness, as seen in a direction transversely of the side wall, of between 2 mm and 10 mm, preferably between 3 mm and 8 mm.

In this way sufficient phase-change material can be provided per unit area, without the handle structure hereby taking on enormous dimensions. The handle structure can in this way be arranged closely against the cooking utensil, which ensures a user-friendly cooking utensil which is easy to handle.

In a preferred embodiment the phase-change material extends in a layer substantially parallel to the side wall, wherein this layer releases per square centimetre of surface area a heat energy of between 50 joule and 200 joule.

In this way the phase-change material will release sufficient heat energy in an efficient manner so that the cooking utensil and the content of the cooking utensil can remain at temperature for longer.

In an exemplary embodiment the phase-change material has a melting temperature of between 55° C. and 95° C., preferably between 65° C. and 85° C.

In this way the phase-change material can absorb heat in an efficient manner when the cooking utensil is being heated via the bottom wall. When the cooking utensil is then in danger of cooling, the phase-change material will gradually release the absorbed heat again.

In a preferred embodiment the number of grams of phase-change material relative to the volume of the cooking utensil lies between 40 and 200 g/l, preferably between 50 and 160 g/l.

In this way a good thermal action of the phase-change material can be guaranteed for cooking utensils of different sizes and volumes.

In a preferred embodiment the at least one handle structure comprises a first and a second handle structure, wherein the first and the second handle structure are arranged against the outer side of the upright side wall and wherein the first and the second handle structure comprise a phase-change material.

In this way the cooking utensil can be easily gripped with two hands by a user. Phase-change material can thus be distributed along the periphery of the upright side wall in an efficient manner.

In an exemplary embodiment the first and the second handle structure are arranged substantially opposite each other against the outer side of the upright side wall.

In this way a user can easily grip the cooking utensil with two hands in order to set it down on for instance the hob or the table. Each of the two handle structures preferably comprises phase-change material, and the phase-change material of the first handle structure extends over a half of the circumference of the outer side of the upright side wall which corresponds to the first handle structure and the phase-change material of the second handle structure extends over a half of the circumference of the outer side of the upright side wall which corresponds to the second handle structure. In this way the phase-change material extends over the whole circumference of the outer side of the upright side wall.

In an exemplary embodiment the first and the second handle structure are attached to each other all around the outer side of the upright side wall.

In this way the first and second handle structure can be arranged all around the outer side of the upright side wall of the cooking utensil, without the cooking utensil having to be adapted for this purpose. The handle structures can be fixedly or removably attached to each other. When the handle structures are removably attachable to each other, the handle structures can be arranged on different cooking utensils.

A second aspect of the invention relates to a cooking utensil with a warm-keeping structure, wherein the cooking utensil comprises a bottom wall and an upright side wall. The warm-keeping structure is arranged around the outer side of the upright side wall and the warm-keeping structure comprises phase-change material. In this way the phase-change material is situated close to the outer side of the upright side wall and the bottom wall of the cooking utensil remains free of phase-change material. A good contact between the bottom wall of the cooking utensil and the hob can hereby be guaranteed. The phase-change material will moreover absorb heat when the cooking utensil is being heated, and the phase-change material will gradually release the absorbed heat to the cooking utensil again after the heating. The content of the cooking utensil can remain at temperature for longer owing to the heat released by the phase-change material to the content of the cooking utensil. By providing the phase-change material in a warm-keeping structure arranged around the outer side of the upright side wall the assembly of the cooking utensil can take place in simple manner, without appreciable changes having to be made to the manufacturing process. The warm-keeping structure can be optionally removably arranged around the outer side of the upright side wall.

The warm-keeping structure preferably comprises at least one compartment in which the phase-change material is received. A good positioning of the phase-change material relative to the cooking utensil can hereby be obtained. The phase-change material can also be received in a plurality of compartments, wherein, when the warm-keeping structure is arranged against the upright side wall of the cooking utensil, the compartments are situated at different positions against the upright side wall of the cooking utensil.

The cooking utensil is preferably provided with a handle which is mounted on the side wall, and the warm-keeping structure is arranged under the handle. The presence of a handle makes the cooking utensil easy to grip by a user. By arranging the warm-keeping structure under the handle, the handle remains easily accessible to a user. By arranging the warm-keeping structure on the cooking utensil between the handle and the bottom wall the phase-change material can advantageously absorb heat released by the hob to the bottom wall of the cooking utensil. It is generally the case that the closer the phase-change material is situated to the bottom wall of the cooking utensil, the better the phase-change material can absorb heat.

The warm-keeping structure preferably comprises a belt element which is tightened around the outer side of the upright side wall. In this way the warm-keeping structure can be arranged against and around the upright side wall of the cooking utensil without appreciable changes having to be made to the manufacturing process of the cooking utensil itself. The belt element can be optionally removably tightened around the outer side of the upright side wall.

The warm-keeping structure preferably comprises at least two warm-keeping parts, wherein each warm-keeping part comprises phase-change material and wherein the at least two warm-keeping parts are arranged adjacently of each other around the periphery of the side wall and are attached to each other. In this way a warm-keeping structure can for instance be arranged on the side wall of the cooking utensil in simple manner, wherein each warm-keeping part, in the case of two warm-keeping parts, extends over half of the circumference of the upright side wall of the cooking utensil.

By attaching the different warm-keeping parts to each other around the cooking utensil it is possible to achieve that the warm-keeping structure clamps fixedly around the periphery of the upright side wall of the cooking utensil. In alternative embodiments the different warm-keeping parts of the warm-keeping structure can be arranged independently of each other on the outer side of the upright side wall of the cooking utensil.

In further embodiments a cooking utensil with a warm-keeping structure is provided according to one or more of the following clauses:

1. Cooking utensil with a warm-keeping structure, wherein the cooking utensil comprises a bottom wall and an upright side wall; the warm-keeping structure is arranged around the outer side of the upright side wall; and the warm-keeping structure comprises a phase-change material.

2. Cooking utensil according to clause 1, wherein the warm-keeping structure comprises at least one compartment in which the phase-change material is received.

3. Cooking utensil according to clause 1 or 2, wherein the cooking utensil is provided with a handle which is mounted on the side wall, and wherein the warm-keeping structure is arranged under the handle.

4. Cooking utensil according to any of the foregoing clauses, wherein the warm-keeping structure comprises a belt element tightened around the outer side of the upright side wall.

5. Cooking utensil according to any of the foregoing clauses, wherein the warm-keeping structure comprises at least two warm-keeping parts, wherein each warm-keeping part comprises phase-change material, and wherein the at least two warm-keeping parts are arranged adjacently of each other around the periphery of the side wall and are attached to each other.

6. Cooking utensil according to any of the foregoing clauses, wherein the warm-keeping structure has an inner side and an outer side, wherein the phase-change material is provided in at least one recess on the inner side of the at least one warm-keeping structure.

7. Cooking utensil according to any of the foregoing clauses, wherein the phase-change material lies at a distance d from the bottom wall and this distance is smaller than 4 cm, preferably smaller than 2 cm, still more preferably smaller than 1.5 cm, and most preferably smaller than 1 cm.

8. Cooking utensil according to any of the foregoing clauses, wherein the phase-change material is received in at least one pouch which is arranged in the warm-keeping structure and is adjacent to the outer side of the upright side wall.

9. Cooking utensil according to the foregoing clause, wherein the pouch comprises a first wall and a second wall, wherein a peripheral part of the second wall is attached to a peripheral part of the first wall, wherein a high vacuum prevails in the pouch.

10. Cooking utensil according to any of the foregoing clauses, wherein the warm-keeping structure and the outer side of the upright side wall enclose a space in which phase-change material is received.

11. Cooking utensil according to any of the foregoing clauses, wherein the phase-change material of the warm-keeping structure extends through an angle of at least 250°, preferably at least 300° of the circumference of the outer side of the upright side wall.

12. Cooking utensil according to any of the foregoing clauses, wherein the phase-change material is situated in a band around substantially the whole circumference of the outer side of the upright side wall.

13. Cooking utensil according to any of the foregoing clauses, wherein the bottom wall and the upright side wall are manufactured from at least one of stainless steel, aluminium and cast iron.

14. Cooking utensil according to any of the foregoing clauses, wherein the handle and/or the warm-keeping structure is mounted on the side wall by one or more of the following: a rivet connection, a weld, a clamp connection.

15. Cooking utensil according to any of the foregoing clauses, wherein at least one mounting plate is arranged on the outer side of the side wall and the warm-keeping structure is mounted on the at least one mounting plate.

16. Cooking utensil according to any of the foregoing clauses, wherein the warm-keeping structure comprises at least at a lower side thereof a flame-resistant layer, wherein the flame-resistant layer is preferably manufactured from aluminium or stainless steel.

17. Cooking utensil according to any of the foregoing clauses, wherein the phase-change material extends in a layer with a thickness, as seen in a direction transversely of the side wall, of between 2 mm and 10 mm, preferably between 3 mm and 8 mm.

18. Cooking utensil according to any of the foregoing clauses, wherein the phase-change material extends in a layer substantially parallel to the side wall, and this layer releases per square centimetre of surface area a heat energy of between 50 joule and 200 joule.

19. Cooking utensil according to any of the foregoing clauses, wherein the phase-change material has a melting temperature of between 55° C. and 95° C., preferably between 65° C. and 85° C.

20. Cooking utensil according to any of the foregoing clauses, wherein the number of grams of phase-change material relative to the volume of the cooking utensil lies between 40 and 200 g/l, preferably between 50 and 160 g/l.

21. Warm-keeping structure for use with a cooking utensil according to any of the foregoing clauses, wherein the warm-keeping structure is configured to be arranged around an outer side of an upright side wall of the cooking utensil, and wherein the warm-keeping structure comprises a phase-change material.

BRIEF DESCRIPTION OF THE FIGURES

The above stated and other advantageous properties and objectives of the invention will become more apparent, and the invention better understood, on the basis of the following detailed description when read in combination with the accompanying drawings, in which:

FIG. 1 is an exemplary embodiment of a cooking utensil with two handle structures according to the invention, wherein both handle structures comprise phase-change material;

FIG. 1A is an exemplary embodiment of a handle structure comprising phase-change material according to the invention;

FIG. 1B is a cross-sectional top view of the cooking utensil with two handle structures shown in FIG. 1;

FIG. 4 is an embodiment of a cooking utensil with a warm-keeping structure, wherein the warm-keeping structure comprises phase-change material;

FIG. 4A is an exemplary embodiment of a warm-keeping structure comprising phase-change material according to the invention;

FIG. 4B is a cross-sectional top view of the cooking utensil with warm-keeping structure shown in FIG. 4.

DETAILED EMBODIMENTS

Figure 2A:
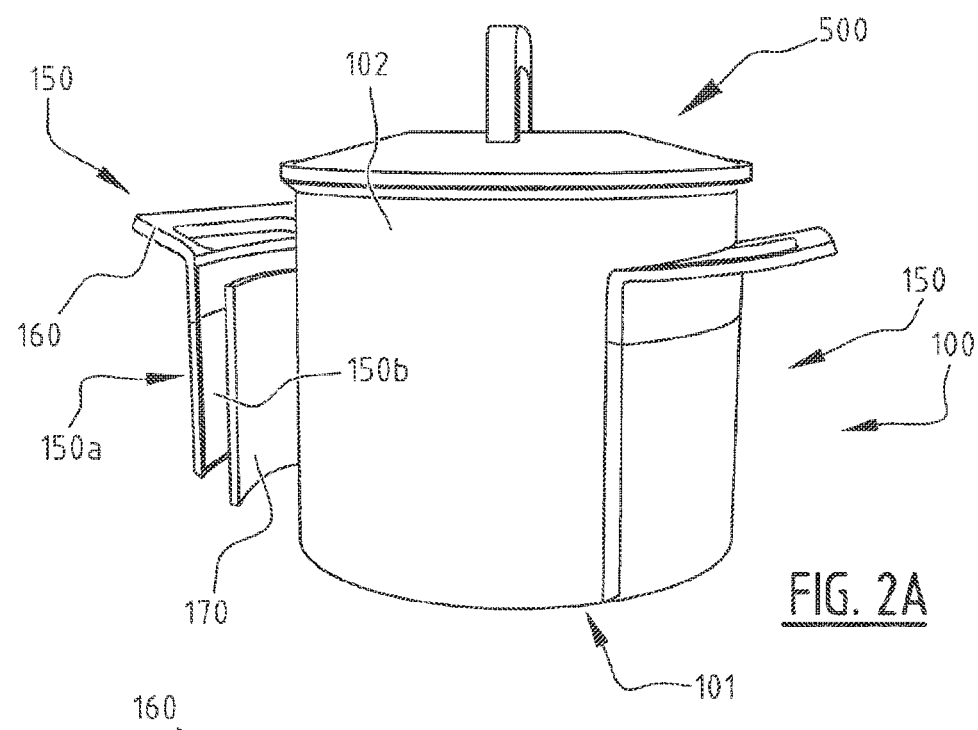
FIG. 2A is an exemplary embodiment of a cooking utensil with two handle structures according to the invention, wherein both handle structures comprise phase-change material.

A first embodiment of a cooking utensil 100 with at least one handle structure 150 is shown in FIG. 1. Cooking utensil 100 has a bottom wall 101 and an upright side wall 102 with an outer side 102a. The shown bottom wall 101 has the form of a round disc and the shown upright side wall 102 has the form of a cylinder jacket. It will however be apparent to the skilled person that the invention can be applied in cooking utensils with a differently formed bottom wall 101 and upright side wall 102. Two handle structures 150 are arranged against the outer side 102a of upright side wall 102 and each of the two handle structures 150 has a gripping part 160 which is configured to be grippable by a user of cooking utensil 100. Each of the two shown handle structures 150 comprises a phase-change material 170. Similarly, only one handle structure 150 could be arranged on the outer side 102a of upright side wall 102, wherein the handle structure 150 can have two or more gripping parts 160. FIG. 1 further also shows a cover 500 which can be arranged removably on cooking utensil 100. Cooking utensil 100 is typically heated via bottom wall 101 by means of a hob, whereby heat develops in cooking utensil 100. By placing cover 500 on cooking utensil 100 it is less easy for the heat to leave cooking utensil 100. The content of cooking utensil 100, typically food, is then enveloped together with the developed heat by bottom wall 101, upright side wall 102 and cover 500 of cooking utensil 100.

In FIG. 1 the phase-change material 170 is enclosed between handle structures 150 and the outer side 102a of upright side wall 102. The phase-change material 170 as shown has the form of a curved rectangular slab extending along the circumference of the outer side 102a of upright side wall 102 in a direction substantially parallel to the plane of bottom wall 101. The handle structures 150 as shown in FIG. 1 do not come into contact with each other. Between handle structures 150 there is thus a clear part of the outer side 102a of the upright side wall 102 of cooking utensil 100, over which no handle structure 150 extends and over which, as a result, no phase-change material 170 extends. In a preferred embodiment this clear part of the outer side 102a of upright side wall 102 is a small as possible. In a further preferred embodiment the two or more handle structures 150 extend all the way up to each other, whereby a continuous band of phase-change material 170 can be obtained which is enclosed between the two or more handle structures 150 and the outer side 102a of upright side wall 102. It will be apparent to the skilled person that a handle structure 150 can also consist of a plurality of parts, these parts extending collectively over substantially the whole circumference of the outer side 102a of upright side wall 102. In determined embodiments different compartments can further be provided in the at least one handle structure 150 for the purpose of receiving phase-change material 170 therein. The compartments can be mutually contiguous compartments, or the compartments can be spread out. In the handle structures 150 shown in FIG. 1 the gripping part 160 is situated at the upper side of cooking utensil 100, close to the opening of cooking utensil 100. It will however be apparent to the skilled person that the principles of the invention can likewise be applied by means of handle structures wherein the gripping part is situated at a different, lower position. It will further be apparent to the skilled person that gripping part 160 can take a different form, for instance the form of a handgrip, elongated handle, latch, knob, ear or lever, that gripping part 160 can be oriented in different ways and that gripping part 160 can be arranged on the handle structure or can be incorporated into the handle structure in different ways.

Phase-change material 170 can either lie loose in a recess 155 between the at least one handle structure 150 and the outer side 102a of upright side wall 102, or be encapsulated in micro or macro-capsules. In a preferred embodiment phase-change material 170 is situated in a pouch between the at least one handle structure 150 and the outer side 102a of upright side wall 102. The pouch is then for instance arranged in the at least one handle structure 150 and is adjacent to the outer side 102a of upright side wall 102.

In an exemplary embodiment the pouch is pressed against the outer side 102a of upright side wall 102 by handle structure 150. The pouch has for instance a first wall and a second wall, each with a peripheral part, wherein the peripheral part of the second wall is attached to the peripheral part of the first wall, wherein a high vacuum prevails in the pouch. The pouch is preferably elastic and flexible to an extent such that the pouch can also stretch when the phase-change material expands during transition from the one phase to the other, and such that the pouch becomes taut again when the phase-change material contracts during a reverse phase transition. In combination with the high vacuum in the pouch, the flexibility of the pouch provides for the largest and most efficient possible contact surface between the phase-change material in the pouch and the outer side 102a of upright side wall 102 without the phase-change material being able to escape.

In FIG. 1 the letter d indicates the distance between phase-change material 170 and the bottom wall 101 of cooking utensil 100. The distance d is preferably kept as small as possible so that phase-change material 170 can absorb as much heat as possible from cooking utensil 100 when cooking utensil 100 is heated along the bottom wall 101, and then releases this heat to cooking utensil 100 again when this utensil is no longer being heated. During heating of cooking utensil 100 temperatures at bottom wall 101 can rise to 250° C. and more. This temperature typically drops rapidly along the upright side wall 102, as seen increasingly further removed from bottom wall 101. At the outer side 102a of upright side wall 102, at several mm above bottom wall 101, the temperature is typically between about 85° C. and 100° C. In a preferred embodiment phase-change material 170 is therefore situated at a distance smaller than 2 cm from upper wall 101. In a further preferred embodiment phase-change material 170 is situated at a distance smaller than 1 cm from bottom wall 101.

FIG. 1A shows a handle structure 150 comprising phase-change material 170 in more detail.

Handle structure 150 has an inner side 150b, an outer side 150a and a gripping part 160 arranged on outer side 150a. In figure 1A phase-change material 170 is situated in a recess 155 at the inner side 150b of handle structure 150. Handle structure 150 is shown as half an open tube, on which a handle 160 is arranged on outer side 150a. As stated above with reference to FIG. 1, it will be apparent to the skilled person that handle structure 150 can take a different form, optionally subject to the cooking utensil 100 for which handle structure 150 is intended.

FIG. 1B shows a cross-section of a top view of cooking utensil 100 with handle structures 150 as shown in FIG. 1. FIG. 1B clearly shows that phase-change material 170 is situated between the inner side 150b of handle structure 150 and the outer side 102a of upright side wall 102. Phase-change material 170 can be arranged in a recess 155 in handle structure 150 itself, or can be arranged in a space enclosed by handle structure 150 and upright side wall 102. As seen from the centre of bottom wall 101 of cooking utensil 100, phase-change material 170 of the handle structure 150 shown on the right-hand side in FIG. 1B extends through an angle α1. As seen from the centre of the bottom wall 101 of cooking utensil 100, phase-change material 170 of the handle structure 150 shown on the left-hand side in FIG. 1B extends through an angle α2. In a preferred embodiment with two handle structures 150 the phase-change material preferably extends through an angle α1+α2 of 360°. Phase-change material 170 of the one handle structure 150 can thus extend through an angle α1 of almost 180° and phase-change material 170 of the other handle structure 150 can extend through an angle α2 of almost 180°, or the two phase-change materials can extend through different angles α1 and α2. In an alternative embodiment more than two handle structures can be arranged against the outer side of the upright side wall, wherein phase-change material is arranged in each of the more than two handle structures. When three handle structures are for instance arranged, the phase-change material can extend through an angle α of 90°-120° per handle structure, such that the phase-change material of the three handle structures extends substantially through an overall angle of 270°-360°.

In FIG. 1B the phase-change material 170 is situated per handle structure 150 in one recess 155 in handle structure 150 or in one space enclosed between handle structure 150 and outer side 102a of upright side wall 102. In alternative embodiments the phase-change material 170 is received per handle structure 150 in several recesses 155 or phase-change material 170 is situated in several optionally contiguous spaces formed between handle structure 150 and outer side 102a of upright side wall 102. Phase-change material 170 is preferably situated at least at the lower side of recess 155 or the space enclosed between handle structure 150 and outer side 102a of upright side wall 102. Depending on the specific form of cooking utensil 100, it can be advantageous to fill the recess 155 or the space enclosed between handle structure 150 and outer side 102a of upright side wall 102 with phase-change material 170 to a higher level.

FIG. 2A shows an embodiment of cooking utensil 100 with two handle structures 150, wherein handle structure 150 and the outer side 102a of upright side wall 102 enclose a space in which the phase-change material 170 is received. Phase-change material 170 is received between inner side 150b of handle structure 150 and the outer side of upright side wall 102. Handle structure 150, wherein inner side 150b and outer side 150a are designated, is shown separately of cooking utensil 100 by way of illustration. Phase-change material 170 is shown as a curved, rectangular slab which follows the contours of the upright side wall 102 of cooking utensil 100. In a preferred embodiment phase-change material 170 is received in a flexible pouch, in which a high vacuum prevails. The pouch is then pressed against the upright side wall 102 of cooking utensil 100 by the inner side 150b of handle structure 150. In a possible embodiment a heat-insulating and/or heat-reflecting layer is provided between the inner side 150b of handle structure 150 and the pouch filled with phase-change material 170. The heat absorbed by phase-change material 170 can hereby be released to cooking utensil 100 again in efficient manner, and heat loss in the direction away from cooking utensil 100 is limited. It is furthermore guaranteed in this way that the temperature of handle structure 150 itself does not rise too high and that gripping part 160 of the handle structure can be gripped and handled by a user without the danger of the user burning him or herself.

In the embodiment shown in FIG. 2A handle structures 150 extend in the direction of bottom wall 101, almost all the way to bottom wall 101. By then providing the phase-change material 170 at the lower side of handle structure 150 it is achieved that phase-change material 170 is situated several mm from bottom wall 101.

In FIG. 2A a substantial part of the periphery of the outer side of upright side wall 102 is clear, i.e. is not provided with phase-change material 170, whereby heat can escape from cooking utensil 100 via the clear part. Less heat would be lost by limiting the clear part of the periphery of upright side wall 102. This can for instance be done by configuring or arranging handle structures 150 such that they extend through a greater angle α1+α2 and that the phase-change material 170 in handle structures 150 covers a greater part of the periphery of upright side wall 102. Alternatively, an additional handle structure with phase-change material 170 or a part of a handle structure could be arranged on the outer side of the upright side wall, whereby a substantial part of the clear part of the periphery of the outer side of the upright side wall is covered.

Figure 2B:
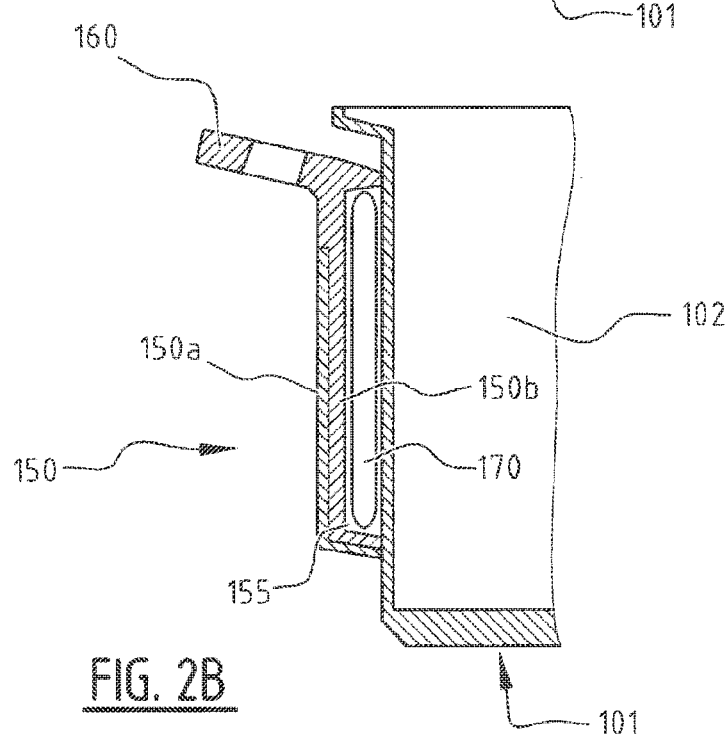
FIG. 2B is a cross-section of the exemplary embodiment shown in FIG. 2A.

FIG. 2B shows a schematic cross-section of a part of the cooking utensil 100 shown in FIG. 2A, which shows how handle structure 150 is arranged on the outer side of upright side wall 102 as according to an embodiment of the invention. Handle structure 150 comprises a plastic part which comprises the gripping part 160 and the inner side 150b of handle structure 150. A flame-resistant protective layer is provided at the outer side 150b of handle structure 150 for the purpose of protecting the plastic. The protective layer is preferably provided at least at the lower side of outer side 150b of the handle structure so that a protective layer is situated between the bottom wall 101 of cooking utensil 100 and the plastic of handle structure 150. This protective layer preferably comprises an aluminium or stainless steel plate. It will however be apparent to the skilled person that materials with similar properties can be used as protective layer and/or handle structure material.

Handle structure 150 is arranged on upright side wall 102 such that handle structure 150 and the outer side of upright side wall 102 enclose a space in which phase-change material 170 is received. The phase-change material is preferably received in a flexible pouch in which a high vacuum prevails.

Bottom wall 101 and upright side wall 102 are preferably manufactured from stainless steel, aluminium and/or cast iron. Handle structure 150 can be mounted on upright side wall 102 by means of welding, riveting or clamping. Alternatively, one or more mounting plates can be arranged on the outer side of upright side wall 102 and the one or more handle structures can be mounted on the one or more mounting plates.

Figure 3A:
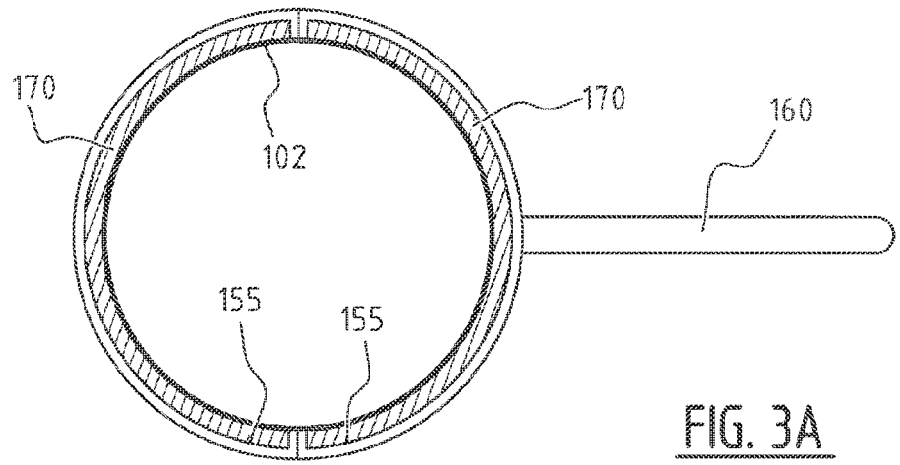
FIG. 3A is a top view of an alternative exemplary embodiment of a cooking utensil with one handle structure according to the invention, wherein the handle structure comprises phase-change material.
Figure 3B:
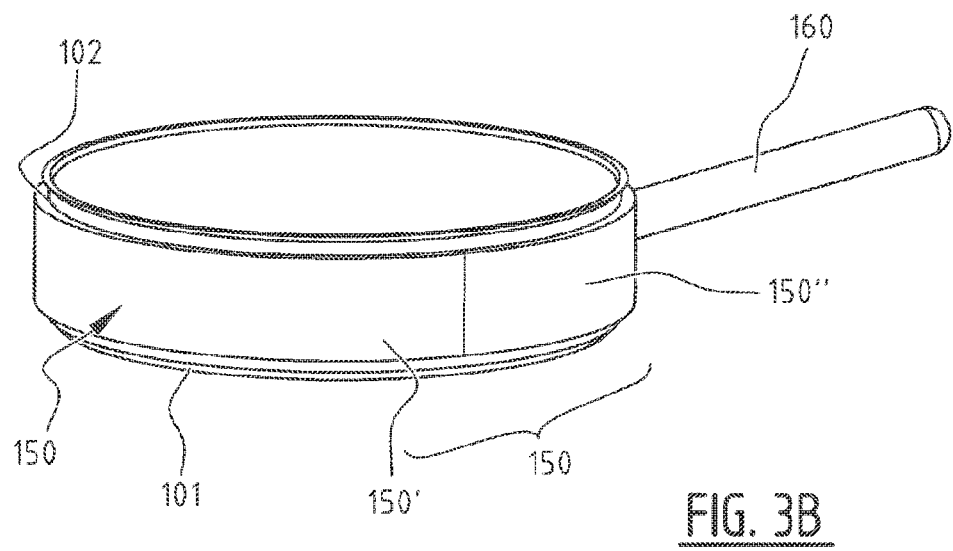
FIG. 3B is a side view of the exemplary embodiment shown in FIG. 3A.

FIGS. 3A and 3B show an embodiment of a low cooking utensil with a handle structure 150. FIG. 3A shows the low cooking utensil in top view and FIG. 3B shows the low cooking utensil in side view. Handle structure 150 comprises two handle structure parts 150' and 150", each extending around half a circumference of upright side wall 102, such that together they surround the whole circumference of upright side wall 102. Phase-change material 170 is provided in a recess 155 in each of the handle structure parts 150' and 150". The recess can likewise be a space which is enclosed by handle structure parts 150' and 150" and the outer side of upright side wall 102. In FIGS. 3A and 3B the two handle structure parts 150' and 150" come into contact with each other along two straight contact lines perpendicularly of the bottom wall of the cooking utensil. Handle structure parts 150' and 150" can be attached to each other, optionally releasably, in the vicinity of the contact lines, for instance by means of a snap connection (not shown). Handle structure parts 150' and 150" can further be formed such that their outer ends fit into each other, whereby they will have no straight contact lines but for instance an indented or serrated contact line, wherein the two handle structure parts 150' and 150" fit into each other just as two puzzle pieces. In an alternative embodiment handle structure parts 150' and 150" are not attached to each other but are arranged on the outer side of upright side wall 102 in a manner such that they surround almost the whole periphery of upright side wall 102. It is here also possible to envisage embodiments wherein the phase-change material is situated inside recess 155 in several optionally mutually contiguous compartments. Handle structure 150 has a handgrip 160 in the form of an elongate handle.

Handle structure 150 extends in a direction perpendicularly of the bottom wall over substantially the whole height of the cooking utensil. This can be advantageous in low cooking utensils. In low utensils the available surface area of upright side wall 102 which lies sufficiently close to bottom wall 101 is moreover limited. Because the handle structure 150, and with this in this case the phase-change material 170, extends over the whole height of the low cooking utensil, the most efficient thermal action possible can be obtained.

FIG. 4 shows a cooking utensil 200 with a warm-keeping structure 250, wherein cooking utensil 200 has a bottom wall 201 and an upright side wall 202. The warm-keeping structure is optionally removably arranged around the outer side of upright side wall 202 and warm-keeping structure 250 comprises phase-change material 270. The cooking utensil further two handles 260 arranged on the outer side of upright side wall 202. Warm-keeping structure 270 is arranged around upright side wall 202 such that the warm-keeping structure extends around substantially the whole circumference of the outer side of upright side wall 202. Phase-change material 270 is provided in warm-keeping structure 250. The phase-change material 270 is arranged in a recess or compartment 255 in warm-keeping structure 250. Although FIG. 4 shows one large recess 255, the warm-keeping structure can comprise a plurality of recesses or compartments in which phase-change material 270 is received. The compartments can be mutually contiguous or can be mutually spaced and be arranged distributed in warm-keeping structure 250. In FIG. 4 warm-keeping structure 250 is clamped around and against upright side wall 202 of cooking utensil 200. Two outer ends of warm-keeping structure 250 can be connected to each other, optionally releasably, by means of a snap connection 180. In an exemplary embodiment warm-keeping structure 250 comprises two warm-keeping parts 251 and 252. The two warm-keeping parts 251 and 252 comprise respectively phase-change material 270a and 270b, see FIG. 4B, and the two warm-keeping parts 251 and 252 are arranged mutually adjacently around the periphery of side wall 202. Warm-keeping parts 251 and 252 can be attached to each other, for instance by means of a snap connection 180. In FIG. 4 the letter d indicates the distance between the phase-change material 270 received in warm-keeping structure 250 and the bottom wall 201 of cooking utensil 200. The distance d is preferably kept a small as possible so that phase-change material 270 can absorb as much heat as possible from cooking utensil 200 when cooking utensil 200 is heated along bottom wall 201, and then releases this heat to cooking utensil 200 again when this utensil is no longer being heated. During heating of cooking utensil 200 temperatures at bottom wall 201 can rise to 250° C. and more. This temperature drops along upright side wall 202 in the direction away from bottom wall 201. The temperature at the outer side 202a of upright side wall 202, at several mm above bottom wall 201, is typically between about 85° C. and 100° C. In a preferred embodiment phase-change material 270 is therefore situated at a distance smaller than 2 cm from upper wall 201. In a further preferred embodiment phase-change material 270 is situated at a distance smaller than 1 cm from bottom wall 201.

FIG. 4A shows in more detail a part 251, 252 of warm-keeping structure 250 as described above. Warm-keeping structure 250 has an inner side 250b and an outer side 250a, and the phase-change material 270 is provided in at least one recess 255 on the inner side 250b of warm-keeping structure 250. The recess can comprise a plurality of compartments. Provided at the one outer end of the shown part 251, 252 of warm-keeping structure 250 is a snap recess 180b which, together with a protruding snap part 180 at the other outer end of shown part 251, 252 of warm-keeping structure 250, forms a snap connection 180. When a second part 251, 252 of warm-keeping structure 250 is provided with a similar snap recess and protruding snap part, the two parts 251 and 252 of warm-keeping structure 250 can be attached to each other all around upright side wall 202 by means of two snap connections 180. It will be apparent to the skilled person that different snap connections and alternative connecting techniques can be applied in order to attach various parts 251, 252 of warm-keeping structure 250 to each other.

FIG. 4B shows a cross-section of a top view of cooking utensil 200 with warm-keeping structure 250 as shown in FIG. 4. FIG. 4B clearly shows that the phase-change material 270a in part 251 of warm-keeping structure 250 is situated between the inner side of part 251 of warm-keeping structure 250 and the outer side of upright side wall 202. In the same way, the phase-change material 270b in part 252 of warm-keeping structure 250 is situated between the inner side of part 252 of warm-keeping structure 250 and the outer side of upright side wall 202. Phase-change material 270 can be arranged in a recess 255 in warm-keeping structure 250 itself or can be arranged in a space enclosed by warm-keeping structure 250 and upright side wall 202. As seen from the centre of bottom wall 201 of cooking utensil 200, phase-change material 270a of part 251 of warm-keeping structure 250 extends through an angle α1. As seen from the centre of the bottom wall 201 of cooking utensil 200, phase-change material 270b of part 252 of warm-keeping structure 250 extends through an angle α2. In a preferred embodiment with the two parts 251, 252 the phase-change material 270a, 270b preferably extends through an angle $\alpha 1+\alpha 2$ of 360°. Phase-change material 270a of part 251 can thus extend through an angle $\alpha 1$ of almost 180° and phase-change material 270b of the other part 252 can extend through an angle $\alpha 2$ of almost 180°. In an alternative embodiment the two phase-change materials extend through different angles $\alpha 1$ and $\alpha 2$. In FIG. 4B phase-change material 270a, 270b is situated per part 251, 252 in one recess 255 or in one space enclosed between the respective part 251, 252 of warm-keeping structure 250 and the outer side of upright side wall 202. In alternative embodiments phase-change material 270a, 270b is received per part 251, 252 in several recesses 255 or phase-change material 270a, 270b is situated in several optionally contiguous spaces formed between the respective parts 251, 252 of warm-keeping structure 250 and the outer side of upright side wall 202. Phase-change material 270 is preferably situated at least at the lower side of recess 255 or the space enclosed between warm-keeping structure 250 and the outer side of upright side wall 202. Depending on the specific form of cooking utensil 200, it can be advantageous to fill the recess 255 or the space enclosed between warm-keeping structure 250 and the outer side of upright side wall 202 with phase-change material 270 to a higher level. Phase-change material 270a, 270b is preferably received in a pouch in which a high vacuum prevails. The pouch is then arranged in recess 255 of warm-keeping structure 250 and is adjacent to the outer side of upright side wall 202.

Figure 5:
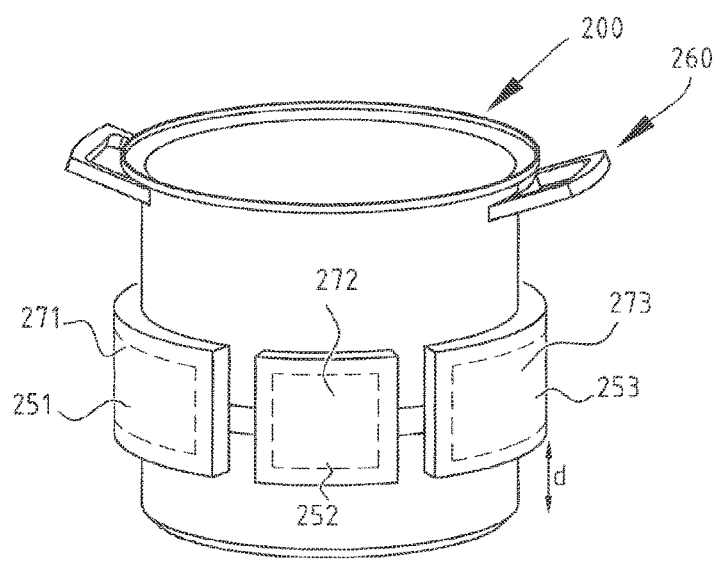
FIG. 5 is an alternative embodiment of a cooking utensil with a warm-keeping structure, wherein the warm-keeping structure comprises phase-change material.

FIG. 5 shows an embodiment of a cooking utensil 200 with warm-keeping structure 250, wherein the warm-keeping structure comprises a belt element extending around the outer side of the upright side wall. The belt element comprises several warm-keeping parts 251, 252, 253, in which respective phase-change material 271, 272, 273 is received. The warm-keeping parts 251, 252, 253 can as it were be deemed a miniature version of the part of warm-keeping structure 250 shown in FIG. 4A. The warm-keeping parts are mutually connected by means of a belt or strap. In a preferred embodiment the length of the belt is adjustable. Warm-keeping structure 250 can hereby be arranged around cooking utensils of different sizes and forms. In an alternative embodiment the strap or belt is manufactured from an elastic or stretchable material. In this way the warm-keeping structure can be tightened around the outer side of the upright side wall without any additional auxiliary means.

The skilled person will appreciate that the invention is not limited to the above described embodiments, and that many modifications and variants are possible within the scope of the invention, which is defined solely by the following claims.

The invention claimed is:

1. A cooking utensil with at least one removable handle structure, the cooking utensil comprising:
a bottom wall and an upright side wall with an outer side;
wherein the at least one handle structure is arranged against the outer side of the upright side wall in a removable manner;
wherein the at least one handle structure comprises a gripping part configured to be grippable by a user;
wherein the at least one handle structure comprises a phase-change material in the form of a curved rectangular slab extending along a circumference on the outer side, the phase-change material enclosed between the at least one handle structure and the outer side of the upright side wall, and
wherein the bottom wall is free of phase-change material.

2. The cooking utensil according to claim 1, wherein the at least one handle structure has an inner side and an outer side wherein the gripping part is provided on the outer side and the phase-change material is provided in a recess on the inner side of the at least one handle structure.

3. The cooking utensil according to claim 2, wherein the recess comprises a plurality of compartments and wherein phase-change material is provided in the compartments.

4. The cooking utensil according to claim 1, wherein the phase-change material lies at a distance from the bottom wall, and this distance is less than 4 cm.

5. The cooking utensil according to claim 1 wherein the phase-change material is, for each handle structure, received in a pouch arranged in the respective handle structure and is adjacent to the outer side of the upright side wall.

6. The cooking utensil according to claim 5, wherein the pouch is pressed against the outer side of the upright side wall by the handle structure.

7. The cooking utensil according to claim 5, wherein the pouch comprises a first wall and a second wall, wherein a peripheral part of the second wall is attached to a peripheral part of the first wall, and wherein a high vacuum exists in the pouch.

8. The cooking utensil according to claim 5, wherein the pouch is adapted to be pressed against the outer side of the upright side wall.

9. The cooking utensil according to claim 5, wherein the pouch comprises a plurality of compartments which are separated from each other by a pliable strip.

10. The cooking utensil according to claim 1, wherein the phase-change material of the at least one handle structure extends through an angle of at least 250° of the circumference of the outer side of the upright side wall.

11. The cooking utensil according to claim 1, wherein the phase-change material is situated in a band around substantially the circumference of the outer side of the upright side wall.

12. The cooking utensil according to claim 1, wherein at least one mounting plate is arranged on the outer side of the side wall and the at least one handle structure is mounted on the at least one mounting plate.

13. The cooking utensil according to claim 1, wherein the handle structure comprises at least at a lower side thereof a flame-resistant layer, and wherein the flame-resistant layer is manufactured from aluminum or stainless steel.

14. The cooking utensil according to claim 1, wherein the phase-change material extends in a layer with a thickness, as seen in a direction transversely of the side wall, of between 2 mm and 10 mm.

15. The cooking utensil according to claim 1, wherein the phase-change material extends in a layer substantially parallel to the side wall, and said layer is configured to release per square centimetre of surface area a heat energy of between 50 joule and 200 joule.

16. The cooking utensil according to claim 1 wherein the phase-change material has a melting temperature of between 55° C. and 95° C.

17. The cooking utensil according to claim 1 wherein the number of grams of phase-change material relative to the volume of the cooking utensil lies between 40 and 200 g/l.

18. The cooking utensil according to claim 1 wherein the at least one handle structure comprises a first and a second handle structure, wherein the first and the second handle structures are arranged against the outer side of the upright side wall, and wherein the first and the second handle structures comprise a phase-change material.

19. The cooking utensil according to claim 18, wherein the first and the second handle structures are arranged substantially opposite each other against the outer side of the upright side wall.

20. The cooking utensil according to claim 18, wherein the first and second handle structures are attached to each other all around the outer side of the upright side wall.

\* \* \* \* \*